| | | |
|---|---|---|
| E READOUT | Q SEQUENCE NUMBER | ALTERNATE CONDITION |
| D ADD | M REMARKS | |
| X CANCEL | F FACTS | |
| R RECONFIRM | L TIME LIMITS | |
| T TICKET | Y FLIGHT | 118 |
| A ACCESS RECORD | N NAME | 116 |
| O NEW RECORD | S SEAT | P END OF ENTRY |

3,480,945
MANUALLY OPERABLE FORMAT CONTROL UNIT
FOR THE REAL-TIME OPERATION OF A DATA
PROCESSING SYSTEM
Hilding E. Nelson, Scandia Township, Washington
County, Minn., assignor to Sperry Rand Corporation, New York, N.Y., a corporation of Delaware
Original application July 2, 1962, Ser. No. 206,915, now Patent No. 3,302,189, dated Jan. 31, 1967. Divided and this application Dec. 16, 1966, Ser. No. 602,265
Int. Cl. G06c 7/09
U.S. Cl. 340—345          7 Claims

ABSTRACT OF THE DISCLOSURE

A Central Processor and a remotely located Operator's Control Unit coupled thereto for permitting an operator to transmit to the Central Processor, by means of a Format Control Unit, data representative of activated transaction buttons, and, by means of a Typewriter Control Unit, data associated with the particular activated transaction button. A master transaction button illuminates certain associated transaction buttons alerting the operator of associated data that must be transmitted to the Central Processor by the Typewriter Control Unit and an end-of-entry transaction button alerts the operator of data associated with the master button that has not been transmitted to the Central Processor.

CROSS-REFERENCE TO RELATED APPLICATION

The present application is a divisional application of my parent application, now Patent No. 3,302,189.

BACKGROUND OF THE INVENTION

Conventional business data processing is serial; that is, the information, or data, is gathered, stored, and then processed in batches. Until the processing run has been completed and the record file compiled, there is no way of obtaining a particular item of the information making up the record file. However, there are many business conditions when the capability to make inquiries of a record file that is always up-to-the-minute has a considerable value. It may be important to know, for example, the number on hand of a particular item as of this minute, not numbers that were on hand last week when the monthly inventory was run.

One place where such up-to-the-minute information would be of inestimable value is in the making of airline reservations or in the entering of transactions in a savings account passbook. This type of data processing operation is called real-time operation. In such business operations having a plurality of remotely located operation points it is necessary to provide means whereby up-to-the-minute data may be entered into or taken from the central computer installation, or Central Processor. A preferred embodiment of this invention has particular application to an Operator's Control Unit which may be located at such remotely located operation points. The separate Operator's Control Unit may be interconnected to the Central Processor by a communication link consisting of a leased telephone line whereby an operator at a remotely located operation point may have instantaneous communications with the Central Processor. This communication link permits instantaneous access to the Central Processor's random access mass storage media to permit the entering of new data therein or to permit the making of corrections or revisions to already entered data. A preferred embodiment of this invention is incorporated in the Format Control Unit of an Operator's Control Unit having typewriter input/output means associated therewith whereby the data to be entered by the operator into the Central Processor is typed out on a conventional typewriter keyboard. The output of the Typewriter Control Unit is fed to an Encoder that generates a unique train of digital data for each typewriter character. Each train of digital data consists of a word, with each word consisting of a plurality of bits, or binary digits, which are electrical bi-level voltage signals representative of a "1" or of a "0." Information requested from the Central Processor is, by the reverse process, typed out on the Typewriter Control Unit appearing as a conventional type-written message.

SUMMARY OF THE INVENTION

The Format Control Unit is a device that performs two functions: operator prompting, and message format designation. The Format Control Unit consists of a plurality of interrelated switches, lights, and control elements that inform the operator, visually by the illuminating of a light, and the Central Processor, by coded digital data transmission over the communication link, of the type of data concerned and the specific operator function involved. By pushing any one of a plurality of switch buttons, each button clearly indicating both visually to the operator and electrically to the Central Processor the type of data concerned, the operator establishes the class, or format, of the information that is to follow on the Typewriter Control Unit output to the Central Processor. Thus, in an embodiment in which the Operator Control Unit is installed at an airlines reservation agency, or ticket office, information reflecting that a new customer wishes to make a reservation on a specific flight for a specific date might be entered in the Central Processor in the following manner. First, the operator would depress the Format Control Unit NEW RECORD button. This would illuminate all the Format Control Unit buttons associated with data required to be entered to complete a NEW RECORD transaction and would automatically transmit to the Central Processor the digital data code for such transaction. Next, the operator might press the Format Control Unit NAME button alerting the Central Processor that the following data from the Typewriter Control Unit will be the new customer's name. After typing out the new customer's name on the Typewriter Control Unit keyboard the operator might depress the FLIGHT button alerting the Central Processor that the following data from the Typewriter Control Unit will be the flight number for which a reservation is requested. The operator then continues through the designated NEW RECORD transactions depressing the Format Control Unit END OF ENTRY button upon the completion of transmission of all of the required information. If all the Format Control Unit buttons associated with a New Record transaction have been depressed, indicating that the associated data has been entered, depressing the END OF ENTRY button switches OFF the remaining illuminated buttons visually indicating that the operator may initiate a new transaction and electrically informing the Central Processor that the preceding transactiton is completed. However, if after depressing the END OF ENTRY button any of the remaining illuminated buttons remain ON the operator is informed thereby that the data associated with the remaining illuminated button was not entered into the Central Processor. Thus, the operator is alerted, or prompted, to complete the transaction.

In a preferred embodiment of this invention the control elements are transfluxor-type elements utilized as bistable saturable transformers and as bistable devices. As saturable transformers the transfluxors by being switched from the blocked to the unblocked state are enabled to couple an AC, or fluctuating DC, signal to indicator lights which visually inform the operator of the type of transaction involved and of the required related data while as a bistable device the transfluxors by being switched from the blocked to the unblocked state, or from the unblocked to the blocked state, generate a pulse-type signal which when coupled to an encoder informs the Central Processor of the type of information that is to be transmitted from the associated Operator's Control Unit.

Accordingly, it is the primary object of this invention to provide an Operator's Control Unit that will permit instantaneous visual and electrical classificatiton of data which is to be stored in the master file of a Central Processor.

It is a further object of this invention to provide an apparatus that will visually indicate to the operator and electrically indicate to the Central Processor the type of transaction involved and the related information required.

It is a further object of this invention to provide an apparatus whereby from a remote operator's station a Central Processor will be alerted and programmed for the type of information that is to be transmitted thereto.

It is a further object of this invention to provide an apparatus utilizing transfluxors as bistable saturable transformers and bistable devices to provide two types of output signals.

It is a still further object of this invention to provide an apparatus utilizing transfluxors as bistable saturable transformers and bistable devices to perform logic functions.

These and other more detailed and specific objects will be disclosed in the course of the following specification, reference being had to the accompanying drawings.

DESCRIPTION OF THE PREFERRED EMBODIMENT

Figure 1:
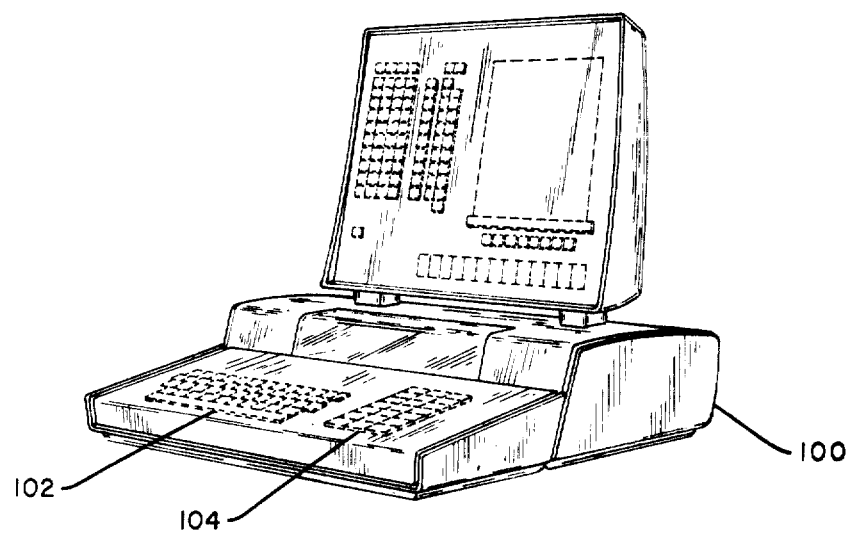
FIG. 1 is an illustration of the Operator's Control Unit which permits remote communication with a Central Processor.

The illustrated embodiment of FIG. 1 depicts an Operator's Control Unit 100 which includes a Typewriter Control Unit 102 and a Format Control Unit 104.

Figure 2:
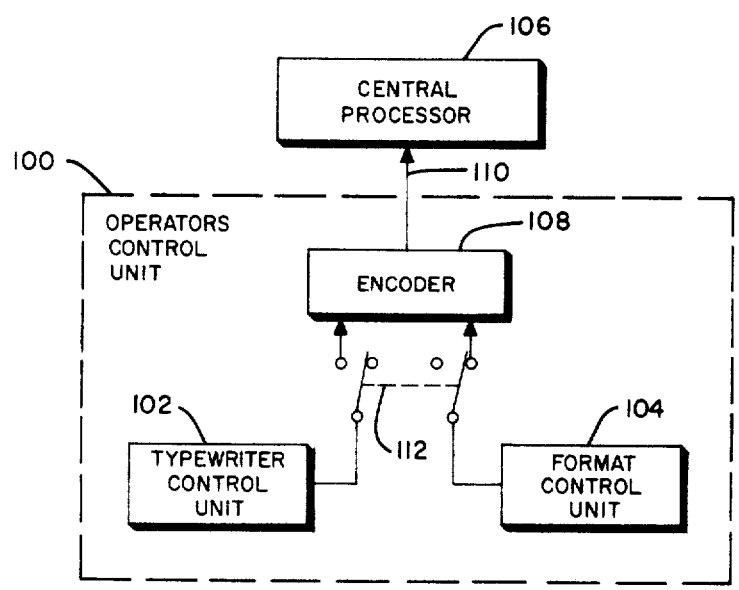
FIG. 2 is a block diagram of the Format Control Unit, Typewriter Control Unit and Encoder portions of the Operator's Control Unit.

FIG. 2 is a block diagram of the remote communication system of this invention. Typewriter Control Unit 102 provides alpha-numeric input through a conventional typewriter keyboard to Encoder 108 which encodes a unique digital signal train, or code, of 7 bits for each typewriter key character. Format Control Unit 104 provides format input to Encoder 108 through a matrix of transaction buttons, each button providing separate inputs to Encoder 108 which encodes a unique digital signal train, or code, of 8 bits for each button. The output from Encoder 108, providing Typewriter Control Unit 102 code and Format Control Unit 104 code as determined by switch 112, is then transmitted to Central Processor 106 over a common communication link 110. Communication back from Central Processor 106 to Operator's Control Unit 100 is over the same communication link 110.

Figures 3, 3A:
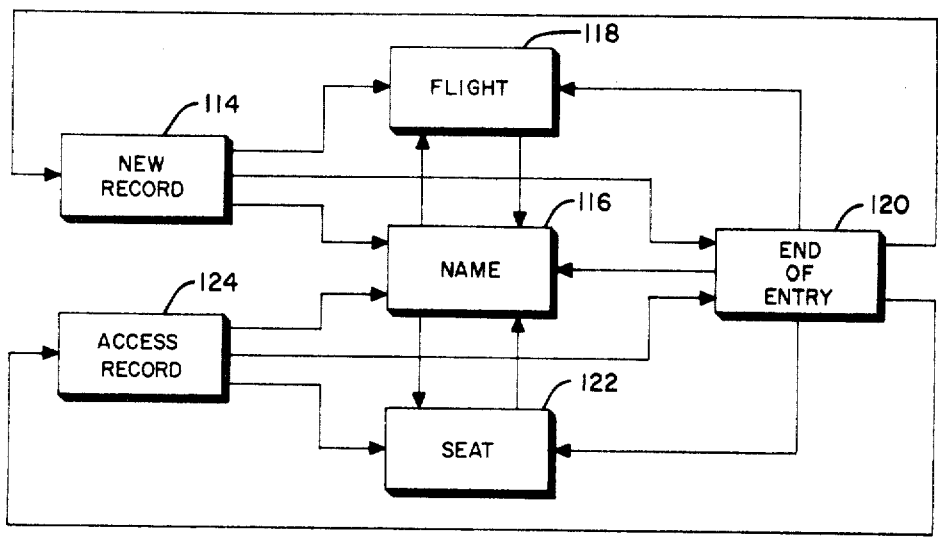
FIG. 3 is a block diagram of the switch functions of the Format Control Unit.
FIG. 3a is an illustration of a typical arrangement and nomenclature of the transaction buttons of a Format Control Unit.
Figure 6:
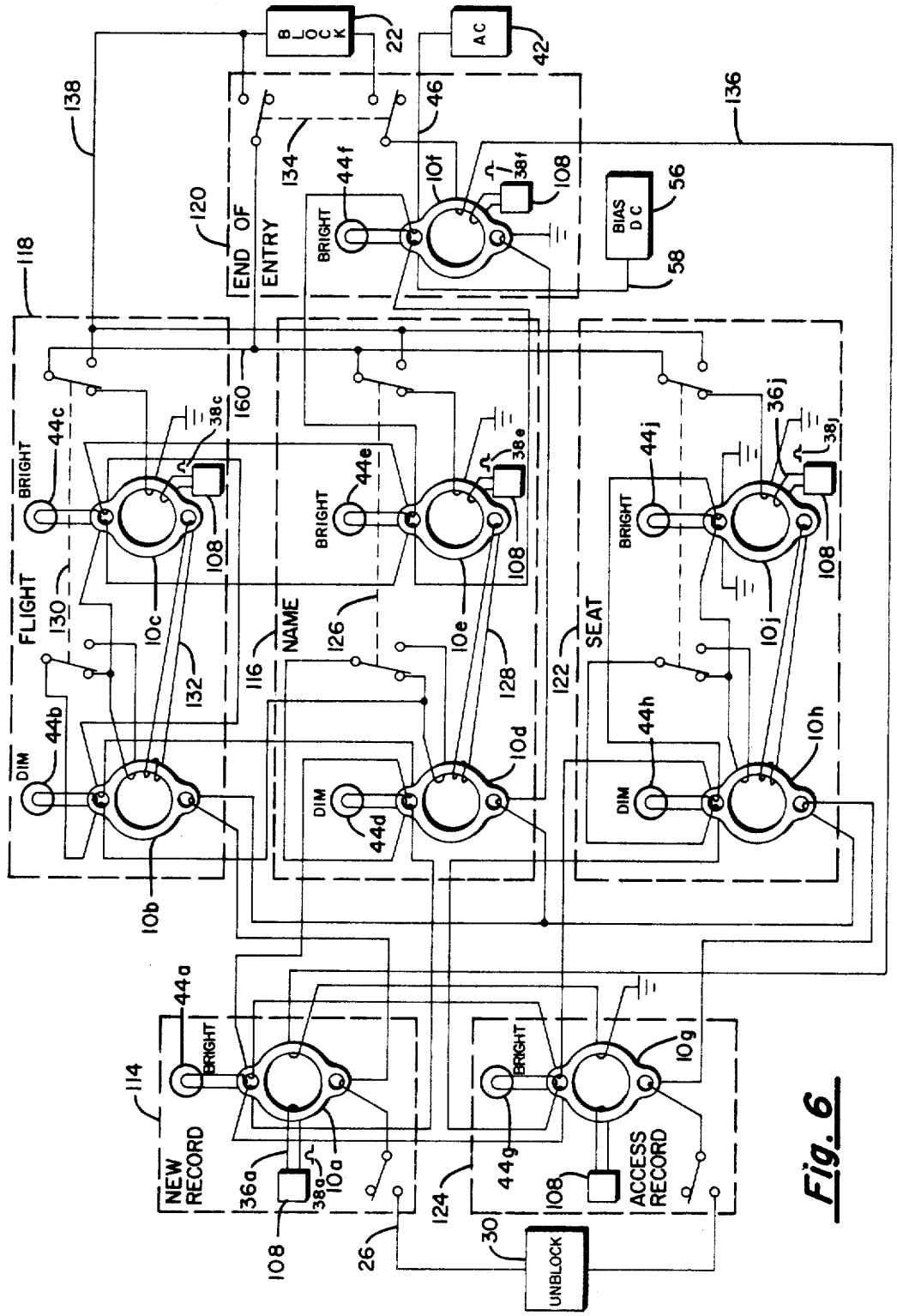
FIG. 6 is a schematic diagram of a preferred embodiment of the transfluxor of FIG. 4 in a Format Control Unit as utilized in this invention.

FIG. 3 is a block diagram of the Format Control Unit 104 and illustrates in simplified form the sequential operation of the lights of FIG. 6 with an arrow from a function block signifying the flow of blocking or unblocking signals from the respective function block. Depressing the function block NEW RECORD 114 initiates an unblocking signal to all the associated function blocks, or function blocks NAME 116, FLIGHT 118, and END OF ENTRY 120, with the lights associated with function blocks NEW RECORD and END OF ENTRY being switched on to Bright while the lights associated with function blocks NAME and FLIGHT are switched on to Dim. Next, depressing function block NAME 116 switches the light associated therewith to Bright, then depressing the function block FLIGHT 118 switches off the light associated with function block NAME 116, and finally, depressing the functional block END OF ENTRY 120 switches off all the remaining on lights which were initiated by the depressing of function block NEW RECORD 114. Function block SEAT 122 not having been switched on by the depressing of function block NEW RECORD 114, it being turned on only by the depressing of function block ACCESS RECORD 124 is ineffective as regards the above listed lights if accidentally depressed.

FIG. 3a illustrates a typical arrangement of the function blocks, or buttons, of a keyboard of Format Control Unit 104. Buttons in the leftmost column are designated master buttons while the remaining buttons are designated field buttons. Associated with any one master button, say NEW RECORD 114, might be a plurality of field buttons such as field buttons FLIGHT 118, NAME 116, and END OF ENTRY 120. Depressing any master button switches ON all the associated field button lights while the pressing of field button END OF ENTRY 120 switches off all the previously ON lights. In a preferred embodiment, as illustrated in FIG. 6, it was desired to have the depressing of any master button switch ON all the associated field button lights to DIM and END OF ENTRY 120 to BRIGHT. Then, depressing any associated DIM button switched that associated light to BRIGHT, indicating to the operator that the associated information was to be transmitted to Central Processor 106 via Typewriter Control Unit 102. After transmission of the information associated with the BRIGHT button, the operator depressed any DIM button which action switched OFF the previously BRIGHT button and switched the depressed button from DIM to BRIGHT informing the operator that the associated information was to be transmitted to Central Processor 106 via Typewriter Control Unit 102. The operator continued on randomly depressing all DIM buttons, switching them to BRIGHT and transmitting all the associated information to Central Processor 106 via Typewriter Control Unit 102. When all the associated information required for that particular transaction—the transaction designated by the master button—had been transmitted to Central Processor 106 via Typewriter Control Unit 102 the operator depressed the field button END OF ENTRY 120 which switched off all the BRIGHT lights. However, if the operator had failed to enter a specific bit of data associated with a field button that particular field button would have remained DIM thus informing the operator of the need to transmit the associated information to Central Processor 106 via Typewriter Control Unit 102.

Relating the above description of the block diagrams of FIGS. 3 and 3a to a broad functional description of the mode of operation thereof it can be seen that Format Control Unit 104 is formed of a plurality of function blocks 114–124, each of which includes at least one control element, or transfluxor core, and a manually operable switch. Function blocks 114–124 are intercoupled in a predetermined manner forming a plurality of groups, i.e., function blocks 114, 116, 118 and 120 form a first group and function blocks 124, 116, 122 and 120 form a second group, and a plurality of sections, i.e., function blocks 114 and 124 form a first section, function blocks 116, 118 and 122 form an intermediate section and function block 120 forms a last section. The predetermined manner of the intercoupling of function blocks 114–124 is such that each function block of the first section is effective to control only those function blocks of its associated group, i.e., function block 114 effects only function blocks 116, 118 and 120, while a function block of the last section is effective to control predetermined function blocks of Format Control Unit 104, i.e., function block 120 effects function blocks 114, 116, 118, 122 and 124.

As a preferred embodiment of this invention as incorporated in the Format Control Unit 104 portion of Operator's Control Unit 100 utilizes transfluxors as the control element a brief discussion of the theory of operation thereof shall be given. Multi-apertured ferrite cores termed "transfluxors" and their conventional operation have been described in the article "The Transfluxor" by Rajchman and Lo, Proceedings of the IRE, March 1956, pp. 321–332. The present invention utilizes a transfluxor illustrated in FIG. 4 that is comprised of a core 10 of magnetic material with a substantially rectangular hysteresis characteristic having these apertures therethrough. Core 10 has a circular form with a large central aperture 12. Two equal diameter smaller apertures, 14 and 16, diametrically opposed, are equally spaced about the central aperture 12. Core 10 has a main leg 6 split at two places by the two smaller apertures 12 and 14 forming legs 1, 2, 3, and 4. Legs 1, 2, 3, and 4 have substantially the same cross sectional area with leg 6 having a cross sectional area equal to, or greater than, that of the sum of any two of the legs 1, 2, 3, or 4. The peripheries of the larger aperture 12 and the two smaller apertures 14 and 16 each define magnetic flux paths, the reluctance of the longer flux path around the larger diameter aperture 12 being substantially greater than the reluctance of the shorter flux paths around the smaller diameter aperture 14 or 16.

The differing reluctances of the three flux paths may be effected by means other than mere flux path lengths. Such means may include different heat treatment of the three flux paths, introducing metals having a differing magnetic characteristic into a particular flux path, or providing a magnetic bias field in one or more flux paths. Consequently, the limitation of physical size of the flux paths, apertures, or legs is not intended to be a limitation upon the inventions disclosed herein.

Figure 5A:
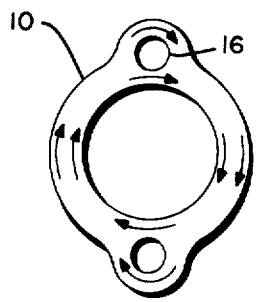
FIG. 5a illustrates the transfluxor magnetic flux paths indicative of a blocked state.
Figure 5B:
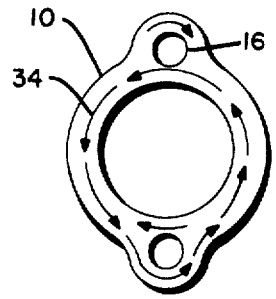
FIG. 5b illustrates the transfluxor magnetic fiux path taken during the unblocking operation.
Figure 5C:
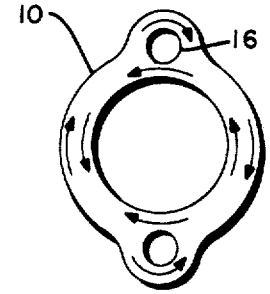
FIG. 5c illustrates the transfluxor magnetic flux paths indicative of an unblocked state.

As illustrated in FIGS. 5a, 5b, and 5c the two magnetic states identified as the "blocked" and "unblocked" states may be defined by the direction of flux orientation through legs 1 and 2 or legs 3 and 4. It is seen that the transfluxor is in a blocked state when the directions of remanent induction of the legs surrounding the smaller aperture 14, legs 1 and 2, are the same and in an unblocked state when they are opposite. It is a characteristic of a transfluxor that the information as to whether the transfluxor is in a blocked or unblocked state can be thought of as being stored in terms of flux through leg 6. In a blocked state the flux in leg 6 is in a clockwise or counterclockwise direction and is of a substantial magnitude while in the unblocked state the flux in leg 6 is of an insubstantial magnitude.

Figure 4:
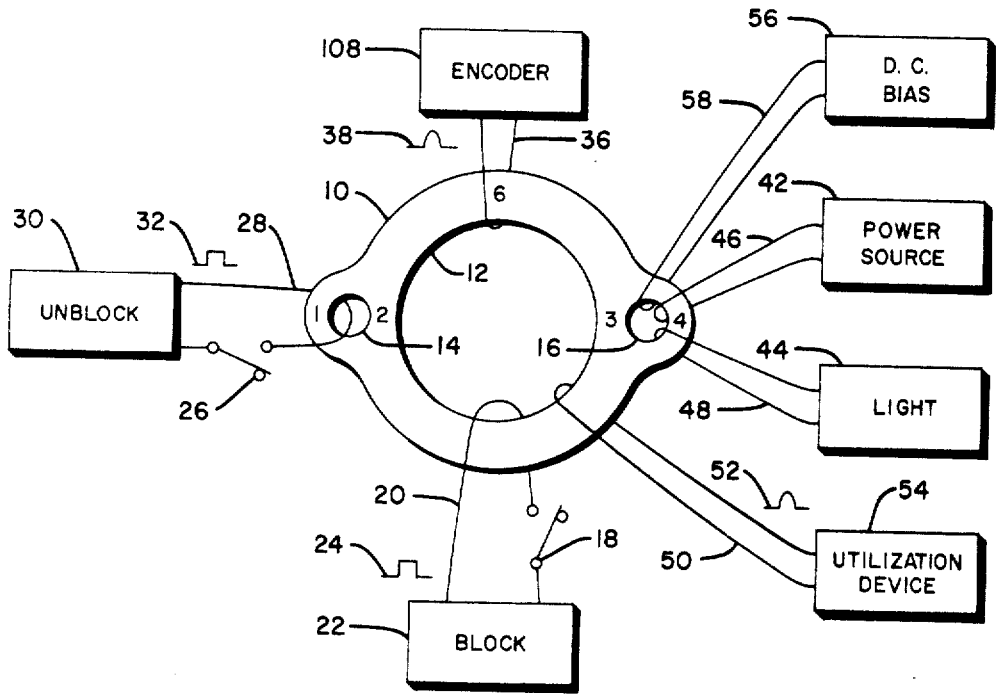
FIG. 4 is an illustration of a transfluxor and its associated circuitry as utilized in this invention.

Operation of core 10 of FIG. 4 is initiated by the closing of normally open, momentarily closed switch 18 which couples, by winding 20, a source 22 of DC potential to leg 6. Pulse 24, from source 22, is of sufficient magnitude and duration so as to completely saturate core 10 with an initial clockwise flux defined as the blocked state. Next, closing the normally open, momentarily closed switch 26 couples, by way of winding 28, a source 30 of DC potential to leg 1. Pulse 32, from source 30, is of sufficient magnitude and duration to reverse the direction of the flux only in legs 1 and 3 as illustrated in FIG. 5b. As flux must necessarily have a closed path and as here the magnitude and duration of pulse 32 is such that the closed flux path is contained in core 10 the reversal of flux in leg 1 must effect a corresponding reversal of flux in legs 3 or 4. As flux follows the path of least reluctance the effect of pulse 32 is to follow the shorter reluctance path 34 and to reverse the flux of leg 3 rather than that of leg 4. Thus, the flux of leg 3 is reversed resulting in core 10 being set in an unblocked state. However, partial reversal of flux in both legs 3 and 4 may be achieved by the unblocking action of pulse 32. The effect of this partial reversal of flux in both legs 3 and 4 would be similar to the condition of FIG. 5b as regards the transfer of flux around aperture 16 as will be explained subsequently in more detail.

Closing of switch 26 couples to Encoder 108 by way of winding 36 a pulse 38 which is induced in winding 36 when core 10 is unblocked by the action of pulse 32 flowing through winding 28. Encoder 108, which is responsive only to a positive pulse, converts the signal from winding 36 to a train of digital data, or code, uniquely identifying the functional designation of core 10 and transmit this unique code to Central Processor 106 by way of communication link 110. By way of example assume that core 10 in the illustrated embodiment is associated with the function block NEW RECORD 114 and that Central Processor 106 is programmed to identify the 8-bit code 10110010 from Operator's Control Unit 100 as signifying that a NEW RECORD is to be transmitted thereto. Thus, the unblocking of core 10 by the above described action of the closing of switch 26 initiates the generation of the code 10110010 in Encoder 108 which code is transmitted to Central Processor 106 over leased telephone lines, such as communication link 110. Central Processor 106 is now ready to receive and classify the 7-bit code transmission of the data output from Typewriter Control Unit 102.

The unblocking of core 10 by the above described action of the closing of switch 26 also couples, by the transformer action of the flux path around aperture 16, power source 42 to light 44. Power source 42 is a continuously operating source of fluctuating DC and is coupled to leg 4 by winding 46. When core 10 is in a blocked state the flux in legs 3 and 4 being in the same magnetic direction as regards aperture 12 is effectively saturated and incapable of performing any transformer action as regards the transfer of flux from leg 3 to 4, or vice versa. However, when core 10 is in a unblocked state the transfer of flux from leg 3 to 4, or vice versa, is possible due to the orientation of the flux in legs 3 and 4 being in opposite directions as regards aperture 12. FIG. 5c shows that a counter-clockwise reversal of flux around aperture 16 may be effected by a signal of the proper polarity on winding 46 with the reversal of the flux in a clockwise direction caused by reversal of such signal polarity on winding 46. This reversal of flux around aperture 16 through legs 3 and 4 couples the signal of power source 42 to winding 48 which illuminates light 44. Light 44 remains illuminated until core 10 is again placed in a blocked state by the action of the closing of switch 18.

Additionally, the blocking of core 10 by the above described action of the closing of switch 18 couples, by way of winding 50, a pulse 52 to a utilization device 54. In the illustrated embodiment of FIG. 6 utilization device 54 is a second core 10a with a pulse 52 coupled to its leg 1 so as to perform an unblocking function as does the switch 26 with respect to core 10.

It has been discovered by the applicant that by utilizing a power source 42 whose output is a fluctuating square wave DC signal of +0 volt to +8 volts with a 10% duty cycle in combination with a bias source 56 providing a DC bias of −1 volt to leg 4 by winding 58 there will be provided an improved signal output. The signal polarity and winding sense of windings 46 and 58 are such that the clockwise flux generating portion of the signals from bias source 56 and power source 42 is of approximately seven volts amplitude while the counterclockwise flux generating portion of said signal is of approximately one volt amplitude. This arrangement drives the flux about aperture 16 harder from the counterclockwise condition to the clockwise condition, thus producing an improved output signal amplitude.

Winding 58 when utilized as a blocking-advance winding and wound about the core's main leg 6 such as leg 6 of core 10b of FIG. 6 consists of ten turns thereabout while when utilized as a bias source winding is merely threaded through the core's smaller aperture 16 such as aperture 16 of core 10b. This number of turns provides the necessary magnetomotive force necessary to switch core 10b from an unblocked to a blocked state.

A preferred embodiment of the transfluxor of FIG. 4 performing the functions discussed with respect to FIGS. 3 and 3a is illustrated in the schematic diagram of FIG. 6. As previously stated, the purpose of Format Control Unit 104 is to visually indicate to the operator the particular transaction involved and the related information required and to electrically indicate to Central Processor 106 the particular transaction involved and the format of the related information which is to be transmitted from the associated Typewriter Control Unit 102.

Initially, for purposes of simplifying the operation thereof, the function blocks of FIG. 6 are identified by similar reference characters as utilized in FIGS. 3 and 3a. Similarly, components of FIG. 6 are identified by similar reference characters as utilized in FIGS. 1 through 5, when such components perform a substantially similar function as in FIGS. 1 through 5, with each of the plurality of similar components of FIG. 6 being distinguished by the addition of a letter suffix to the common reference character.

Visual prompting of the operator is accomplished through the switching ON of indicator lights. Each core 10 has an associated light 44, which cores and lights are distinguished from each other by an addition of a common suffix thereto. Thus, master button NEW RECORD 114 has associated therewith core 10a and light 44a, while field button END OF ENTRY 120 has associated therewith core 10f and light 44f. All lights associated with a particular button, such as field button NAME 116, are enclosed therein such that the depressing of the button switches ON the associated light. DIM and BRIGHT lights are enclosed within the same button and in the preferred embodiment are similar lights, the installation of a hood over any light effecting a light to be classed as DIM as distinguished from BRIGHT. Many methods of effecting a DIM light such as switching a resistor or a different voltage into the light circuit may be utilized. Further, different colored lights, hoods, or buttons may be utilized to effect the desired result, it being understood that the particular embodiment disclosed is not to be construed as a limitation thereof.

Electrical indication to Central Processor 106 of the type of transaction involved and of the format of the related information which is to be transmitted from the associated Typewriter Control Unit 102 is accomplished through windings 36a, c, e, f, g, and j coupling cores 10a, c, e, f, g and j, respectively, to Encoder 108. For purposes of simplifying the wiring of FIG. 6 the respective windings 36a, c, e, f, g and j of cores 10a, c, e, f, g and j, respectively, are illustrated as coupled to a plurality of Encoders 108. However, it is to be understood that such windings couple their respective cores to a single Encoder 108 with each winding 36a, c, e, f, g and j when affected by a pulse 38 causing Encoder 108 to generate and transmit to Central Processor 106 over communication link 110 a unique train of digital data, or code, of 8-bits for each core 10a, c, e, f, g and j.

Discussion of the operation of the embodiment of FIG. 6 shall proceed through a simulated entry in Central Processor 106 of information relative to making an airline reservation for a new customer. This procedure is initiated by the depressing of master button NEW RECORD 114 and is completed by the depressing of field button END OF ENTRY 120.

With all cores 10a through 10j initially set by means not shown to a block state power source 42 is not coupled to any of lights 44a through 44j as legs 3 and 4 of cores 10a through 10j permit no flux transfer therethrough. Thus, initially, all lights 44a through 44j are OFF.

Entry of new information is initiated by depressing master button NEW RECORD 114. This action closes normally open—momentarily closed—switch 26 which couples power source 30 to cores 10a, 10b, 10d, and 10f placing them in an unblocked state. Placing of cores 10a, 10b, 10d and 10f in an unblocked state couples lights 44a, 44b, 44d, and 44f to power source 42 through the transformer action of the flux paths about such core's apertures 16a, 16b, 16d, and 16f, respectively. At this time lights 44a and 44f are BRIGHT, 44b and 44d are DIM and lights 44c and 44e (plus, of course, lights 44g, 44h, and 44j) are OFF. Closing of switch 26 couples a pulse 38a generated upon the unblocking of core 10a to Encoder 108 which causes Encoder to transmit to Central Processor 106 a unique 8-bit code alerting Central Processor 106 that the information which is to be generated by Typewriter Control Unit 102 and encoded by Encoder 108 shall constitute information making up a new transaction.

Next, the operator, wishing to enter the new customer's name into the Central Processor 106 record file, depresses field button NAME 116. This action closes normally open—momentarily closed—switch 126 which couples power source 56 to core 10d by way of winding 58. Closing of switch 126 places core 10d in a blocked state the same as the closing of switch 18 places core 10 of FIG. 4 in a blocked state. Placing core 10d in a blocked state switches OFF light 44d and generates an unblocking, or advance, pulse in winding 128 which being coupled to aperture 14e of core 10e, places core 10e in an unblocked state. Placing core 10e in an unblocked state couples light 44e to power source 42 through the transformer action of the flux paths about aperture 16e of core 10e. Further, placing core 10e in an unblocked state couples a pulse 38e to Encoder 108 which causes Encoder 108 to transmit to Central Processor 106 a unique 8-bit code alerting Central Processor 106 that the information which is to be generated by Typewriter Control Unit 102 and encoded by Encoder 108 shall define a new customer's name. The momentary closing of switch 126 also couples power source to 22 to cores 10c and 10j by conductors 138 and 160 which performs a blocking action thereto. Cores 10c and 10j having been in a blocked state undergo no magnetic state change thereby. At this time lights 44a, 44e and 44f are BRIGHT, light 44b is DIM, and lights 44d and 44c are OFF.

Next, the operator, wishing to enter the new customer's flight number into Central Processor 106 record file, depresses field button FLIGHT 118. This action closes normally open—momentarily closed—switch 130 which couples power source 56 to core 10b by way of winding 58. Closing of switch 130 places core 10b in a blocked state the same as the closing of switch 18 places core 10 of FIG. 4 in a blocked state. Placing core 10b in a blocked state switches OFF light 44b and generates an unblocking or advance pulse in winding 132 which being coupled to aperture 14c of core 10c places core 10c in an unblocked state. Placing core 10c in an unblocked state couples light 44c to power source 42 through the transformer action of the flux path about aperture 16c of core 10c. Further, placing core 10c in an unblocked state couples a pulse 38c to Encoder 108 which causes Encoder 108 to transmit to Central Processor 106 a unique 8-bit code alerting Central Processor 106 that the information that is to be generated by Typewriter Control Unit 102 and encoded by Encoder 108 shall define the new customer's requested flight number. The momentary closing of switch 130 also couples power source 22 to cores 10e and and 10j by conductors 138 and 160 which performs a blocking action thereto. Core 10e is placed in a blocked state the same as the closing of switch 18 places core 10 of FIG. 4 in a blocked state. Placing core 10e in a blocked state switches OFF light 44e by blocking the transformer action of the flux paths about aperture 16e of core 10e. Core 10j having been in a blocked state undergoes no magnetic state change thereby. At this time lights 44a, 44c, and 44f are all BRIGHT and lights 44b, 44d, and 44e are OFF.

Next, the operator, visually checks that all ON lights are BRIGHT indicating that all the required information has been transmitted. After determining that all ON lights are BRIGHT the operator depresses field button END OF ENTRY 120 which switches OFF all the ON lights. Depressing field button END OF ENTRY 120 closes normally open—momentarily closed—switch 134 which couples power source 22 to cores 10f, 10a, and 10g by way of winding 136 and to cores 10c, 10e and 10j by way of winding 160. Cores 10b, 10d, and 10h do not have power source 22 coupled thereto. Thus, if any one of these cores were in an unblocked state—the respective lights ON—they would be unaffected by the closing of switch 134 and consequently, their lights would remain ON. This would alert the operator that the associated information had not been transmitted.

Closing of switch 134 places cores 10f, 10a and 10c in a blocked state—cores 10j, 10e, and 10g already being in a blocked state—the same as a closing of switching 18 places core 10 of FIG. 4 in a blocked state. Placing cores 10f, 10a, and 10c in a blocked state switches OFF lights 44f, 44a, and 44c, respectively. At the same time—when core 10f switches from an unblocked state to a blocked state—there is coupled a pulse 38f to Encoder 108 which causes Encoder 108 to transmit to Central Processor 106 a unique 8-bit code alerting Central Processor 106 that all the information associated with the transaction NEW RECORD has been transmitted. However, this condition is subject to the operator's visual determination that all Format Control Unit 104 lights are OFF.

Although the illustrated embodiment of FIG. 6 utilizes two cores 10 for each associated field button, i.e., cores 10d and 10e for field button NAME 116, it is to be appreciated that the invention disclosed herein is not intended to be limited to this arrangement. One arrangement would be to utilize a single core 10 at each field button with the depressing of the associated field button merely switching OFF the associated ON light. Any field button light being ON would indicate that the information associated with the particular transaction had not been transmitted. In this arrangement the field button END OF ENTRY 120 could function merely as a means to clear the Format Control Unit by switching OFF all the ON lights.

What is claimed is:

1. A data processing system including a central processor and a remotely located operator's control unit coupled thereto, the combination comprising:
   a central processor;
   a remotely located operator's control unit;
   said operator's control unit including a typewriter control unit, a format control unit, an encoder unit and a switch means coupling said typewriter control unit and said format control unit to said encoder means for causing associated unique multi-bit data words to be coupled to said central processor;
   said format control unit having a plurality of transaction buttons;
   first and second groups of said transaction buttons, each group including a separate, associated master button and a plurality of associated field buttons;
   each of said transaction buttons of said first and second groups including light means that are illuminated by activating said associated master button for visually alerting the operator of the data associated with each of said associated field buttons that is to be entered by the operator into the central processor by the typewriter control unit; and,
   each of said transaction buttons of said first and second groups including means coupled to said encoder means that are individually activated by the operator for electrically alerting the central processor by causing to be transmitted thereto the associated unique multi-bit data word that is descriptive of the function of the individually activated associated transaction button.

2. The data processing system of claim 1 wherein said first and second groups of transaction buttons further include an End Of Entry field button including light means illuminated by depressing either of said master buttons for visually alerting the operator to properly terminate the transaction associated with said associated master button, and further including means, when said End Of Entry field button is individually depressed by the operator, for electrically alerting the central processor by causing to be transmitted thereto the unique multi-bit data word that informs the central processor that the transaction associated with the associated master button has been completed.

3. The data processing system of claim 2 wherein said light means of each of said first, and second groups of transaction buttons include means for remaining illuminated when not depressed prior to depressing said End Of Entry field button for visually alerting the operator when the transaction associated with the associated master button has not been completed.

4. A data processing system including a central processor and a remotely located operator's control unit coupled thereto, the combination comprising:
   a central processor;
   a remotely located operator's control unit;
   said operator's control unit including a typewriter control unit, a format control unit, an encoder unit, and a switch means coupling said typewriter control unit and said format control unit to said encoder means for coupling associated unique multi-bit data words to said central processor;
   said format control unit having a plurality of transaction buttons;
   first and second groups of said transaction buttons, each group including a separate, associated master button and a plurality of associated field buttons;
   the transaction buttons of each group including light means that are illuminated by depressing only the associated master button for visually alerting the operator of the associated data words that are to be entered by the operator into the central processor by the typewriter control unit; and,
   each transaction button of each group including means, when individually depressed by the operator, for electrically alerting the central processor by causing to be transmitted thereto the unique multi-bit data word that is descriptive of the function of the individually depressed transaction button.

5. The data procesing system of claim 4 wherein said first and second groups of transaction buttons further include an End Of Entry field button including light means, illuminated by depressing said master button for visually alerting the operator to properly terminate the transaction associated with said associated master button, and further including means when said End Of Entry field button is individually depressed by the operator, for electrically alerting the central processor by causing to be transmitted thereto the unique multi-bit data word that informs the central processor that the transaction associated with the associated master button has been completed.

6. The data processing system of claim 5 wherein the light means of the field buttons of said first and second groups of transaction buttons include means responsively coupled to said End Of Entry field button for visually alerting the operator when the transaction associated with the master button has not been completed.

7. A data processing system including a central processor and a remotely located operator's control unit coupled thereto, the combination comprising:
- a central processor;
- a remotely located operator's control unit;
- said operator's control unit including a typewriter control unit, a format control unit, an encoder unit and a switch means coupling said typewriter control unit and said format control unit to said encoder means for coupling unique multi-bit data words to said central processor;
- said format control unit having a plurality of transaction buttons;
- a first and a second group of said transaction buttons, each group including a separate associated master button and a plurality of associated field buttons, and both groups sharing a common End of Entry field button;
- each of said transaction buttons including a switch means;
- each of said switch means including an illuminating means and a signal transmitting means;
- first and second intercoupling means separately intercoupling all of the transaction buttons of said first and second groups, respectively, for enabling the associated master button, to switch all of the associated master button, to switch all of the associated transaction buttons' illuminating means in a first condition from a third condition;
- means associated with all of said field buttons but said End Of Entry field button for switching the illuminating means at each of said field buttons into a second condition;
- means intercoupling all of said transaction buttons for enabling said End Of Entry field button, to switch all of said illuminating means into said third condition from said second condition.

References Cited

UNITED STATES PATENTS

| | | |
|---|---|---|
| 3,093,817 | 6/1963 | Rajchman. |
| 3,187,321 | 6/1965 | Kameny _____ 340—345 |

THOMAS A. ROBINSON, Primary Examiner

MARSHALL M. CURTIS, Assistant Examiner

U.S. Cl. X.R.

178—2, 340—174, 166; 365